D. S. BLACKWELL.
AUTOMOBILE SAND AND MUD DOG FOR ATTACHING TO VEHICLE WHEELS.
APPLICATION FILED JUNE 24, 1921.
1,422,078.
Patented July 11, 1922.
2 SHEETS—SHEET 1.
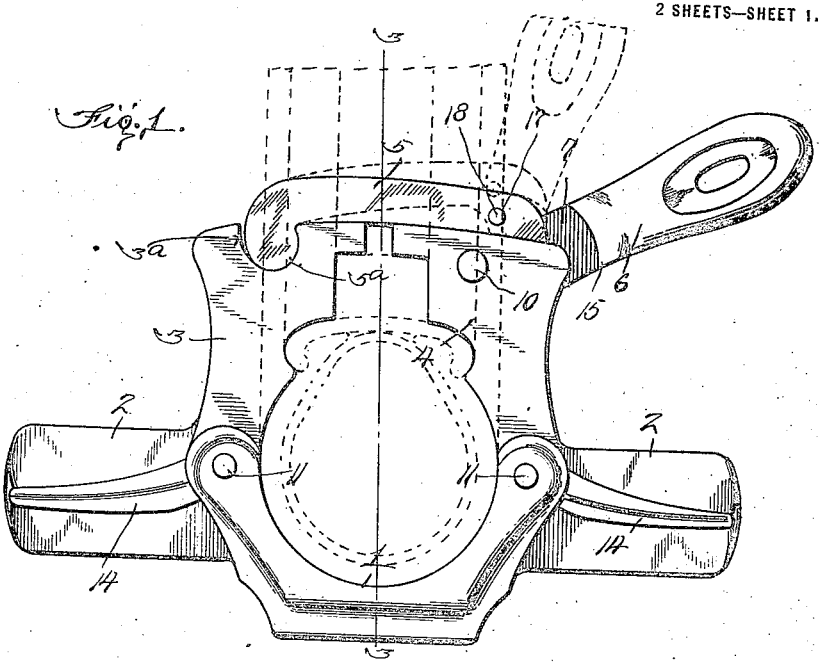
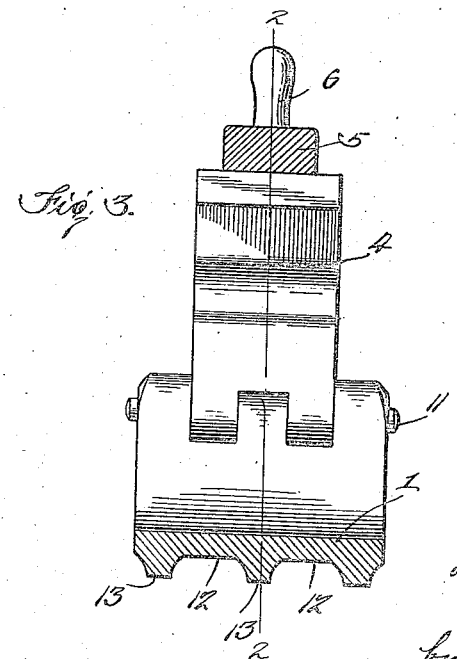
Inventor
Demarkus S. Blackwell
by John W. Keener
Attorney.

D. S. BLACKWELL.
AUTOMOBILE SAND AND MUD DOG FOR ATTACHING TO VEHICLE WHEELS.
APPLICATION FILED JUNE 24, 1921.
1,422,078.
Patented July 11, 1922.
2 SHEETS—SHEET 2.
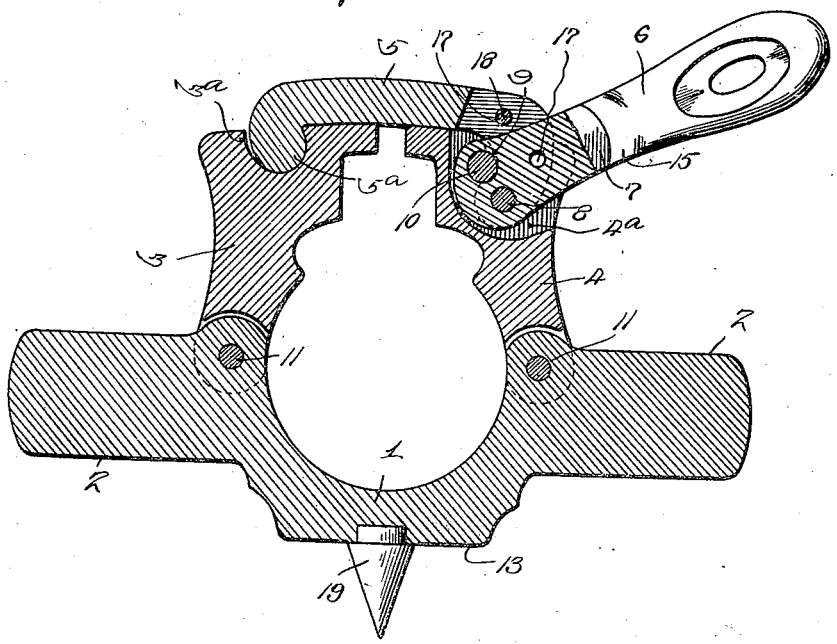
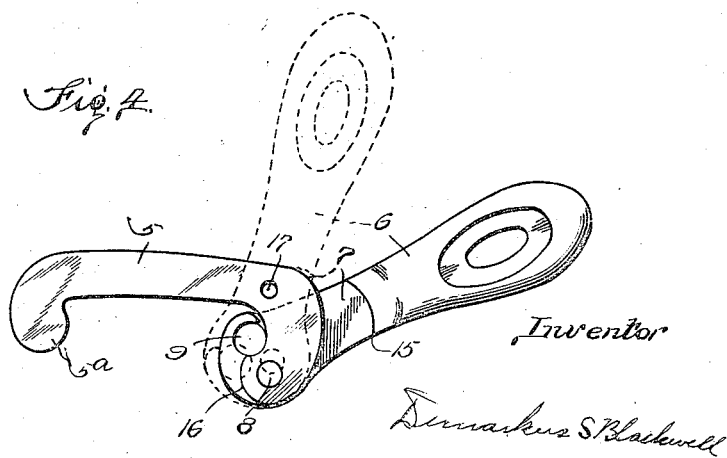

UNITED STATES PATENT OFFICE.

DEMARKUS S. BLACKWELL, OF SAND SPRINGS, OKLAHOMA.

AUTOMOBILE SAND AND MUD DOG FOR ATTACHING TO VEHICLE WHEELS.

1,422,078.  Specification of Letters Patent.  Patented July 11, 1922.

Application filed June 24, 1921. Serial No. 480,252.

*To all whom it may concern:*

Be it known that I, DEMARKUS S. BLACKWELL, a citizen of the United States of America, residing at Sand Springs, in the county of Tulsa and State of Oklahoma, have invented a new and useful Improvement in Automobile Sand and Mud Dogs for Attaching to Vehicle Wheels, of which the following is a specification.

My invention relates to improvements in devices capable of attachment to the wheels of any vehicle, but more particularly to an automobile wheel for the purpose of aiding and lifting a stalled vehicle or automobile out of the sand or mud hole into which one or more wheels may have become sunken.

A principal object of this invention is to provide novel means for attaching the device firmly over the tire, rim and felly of a wheel, yet capable of being quickly released.

Another principal object of the invention is to provide a novel form of tread on the device to firmly grip the earth, sand, or mud, with extensions reaching sufficiently far on both sides to enable the device to engage the firmer ground.

A further object of this invention is to make a novel, quick-locking and releasing device for attaching over and around the tire, rim, and felly of a wheel, provided with a theft prevention lock, giving the device a double use.

With the above and other objects in view which will appear as the description proceeds, the invention further resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawing: Figure 1 shows in side elevation, a device constructed in accordance with the invention, a portion of a wheel and tire appearing in dash line. Fig. 2 is a cross sectional side elevation view of the device depicted in Fig. 1, on line 2—2, Fig. 3. Fig. 3 is a cross sectional view on line 3—3, Fig. 1. Fig. 4 is a detail of releasing and clamping members.

Referring more specifically to the drawing, wherein like reference characters designate corresponding parts in the several views, I have shown in Fig. 1, for purpose of illustration, the improved device over a tire, rim, and felly of an automobile, closed and ready for clamping and locking, which may be done by manually pushing handle 6 to position indicated by dash lines on Figs. 1 and 4, by which action clamping piece 5, provided with incurving rolled catch $5^a$ grips tightly into a corresponding depression $3^a$ provided on side piece 3. Base piece 1 is provided with three traction grips 13, the middle one being extended on both sides for a sufficient distance to reach beyond the rut or hole into which the wheel may have sunken to engage the firmer earth. Between each grip 13 is a depressed portion 12. Base piece 1 may also be provided with spikes 19 as illustrated in Fig. 2 for use on ice or snow, but when not used a plug is inserted in place thereof. The extended middle grip 2 is further provided with reinforced buttressed like projecting portions 14. The inner surface of base piece 1 as illustrated in Figs. 1 and 2 is shaped to fit over the tire of an automobile.

Base piece 1 is pivotally connected to bifurcated portions of side pieces 3 and 4, as illustrated in Figs. 1, 2, and 3. The inner surface of side piece 3 is shaped to correspond to the shape of the tire, rim, and felly of the wheel as shown best in Figs. 1 and 3. The top portion of side piece 3 is made with a depression $3^a$ into which incurving catch $5^a$, provided on clamping piece 5 fits, and is locked or released as desired by appropriate manual movement of handle 6. Side piece 4 is similar to side piece 3 on its inner surface, but differs in certain other particulars and functions, as it carries handle 6 pivoted thereto, as shown in Figs. 1 and 2. Side piece 4 is provided with a depressed portion $4^a$ on top thereof, into which fits the larger bifurcated end of clamping piece 5, which by means of bolt 8 is pivotally attached to handle 6. Handle 6 is in turn pivotally attached to side 4 by means of bolt 10 through hole 9, as shown in Figs. 1, 2, and 4. The interior of depressed portion $4^a$ is semicircular in shape to correspond to the shape of the lower end of handle 6 into which it slidably works. Depressed portion $4^a$ has parallel perpendicular sides. Handle 6 is best shown in Figs. 2 and 4, and is the lever means for manually exerting sufficient force to raise the larger bifurcated end of clamping piece 5 up and thereby force its smaller rolled locking end $5^a$ firmly into depression 3ᵃ on top of side piece 3. When the lower end of handle 6 is pushed to where it passes a certain point the force is then exerted on bolt 10, so the device will remain locked firmly over the tire, rim, and felly of an automobile wheel ready for use until manually released by reversing the handle, or the device may be permanently locked by means of a headed bolt 18 placed through hole 17 and the insertion of the hasp of a lock through the eye provided on the other end of bolt 18. Clamping piece 5 is provided with a rolled end 5ᵃ, which fits into depressed portion 3ᵃ. The other larger bifurcated end of clamping piece 5 is pivotally attached to handle 6 by means of bolt 8. Handle 6 is constructed with flattened sides 7 beginning from shoulder 15 to beyond the holes through which bolts 8 and 10 are inserted. The diameter of handle 6 from shoulder 15 is gradually widened towards the lower curved end, which widening gives more room for bolts 8 and 10, and such widening also aids in holding clamping piece 5 and providing sufficient room for hole 17 through which locking bolt 18 is passed when the device is used as a theft prevention device. This widened end of handle 6 is also provided with a shoulder 16, Fig. 4, which affords a larger and stronger base.

Clamping piece 5 is provided with hole 17, Figs. 1 and 2, through which may be inserted a permanent locking pin or headed bolt 18, provided with an eye or hole sufficiently large for the insertion of the hasp of a lock. This pin would only operate when the device is in a locked position, but when so locked and with locking pin 18 inserted and the hasp inserted and locked, the device as a whole becomes an excellent theft protection device with use similar to that of the well known ones now on the market.

In operation this device is placed over any wheel which has become sunken in sand or mud, or on the traction wheel as necessity indicates, and after fitting clamping piece, by opening the jaws formed by sides 3 and 4 wide, over the felly and into depression 3ᵃ on side 3, it is locked by manually pushing handle 6 into an upright position, which raises clamping piece 5 and pushes its rolled end 5ᵃ very tightly into depression 3ᵃ and so locks it there. To permanently lock the device against theft in such position the headed bolt 18, which may be attached to the device by a chain or wire, is inserted through hole 17 and locked by means of the hasp of a lock inserted through the eye provided in said bolt 18. To release the device when so locked requires a key, and then the manual removal of locking pin or bolt 18, after which by a simple outward pull of handle 6, clamping piece 5 is unlocked, the two sides, forming jaws, open, and the device becomes loosened and easily taken off the wheel. It will be readily seen that in practical use when the device is attached for the purpose of lifting a wheel out of a rut or hole, that, as the wheel to which it is attached is turned around the grips 13 catch into the sand, mud, or earth, and the extensions of the center grip 2 reach over the sides of the rut or hole and insure a better hold on the firmer ground, and so the wheel is raised with the force of the engine, turning the wheel and causes the vehicle to move forward or backward as the case might necessitate, and over the hole or rut on to firmer ground, after which this device is manually removed as hereinbefore described.

It will be noticed that the device will revolve with the wheel without interference in any way with the other parts of the automobile; also that the stronger the force or propulsion furnished the harder the device will hold. The close fitting of the device when attached and its width distributes the pressure over a large enough portion of the tire, rim and felly so it will not injure those members.

In operation as a theft device it will be necessary to provide a lock and key, or some other special locking feature may be used.

Various sizes of this device are contemplated, for Ford wheels as well as for larger, and it will be constructed to fit the various sizes of tires and rims. It is understood that the construction illustrated and herein described represents merely the preferred form of the invention, which may be embodied in other forms without departing from the spirit and scope thereof.

Having thus described my invention, what I claim is:

1. A device for attaching over a wheel comprising a base piece for gripping purposes carrying pivotally attached thereto, two side pieces forming jaws, all of a shape to fit snugly over a tire, rim, and felly of said wheel, a handle pivotally attached to one side piece, a clamping member carried by said handle, capable of being locked to the opposite side piece, and means for connecting said pieces, as and for the purpose described.

2. A device for attaching over a wheel comprising a base piece, provided with a multiple of grips, carrying pivotally attached thereto two side pieces forming jaws of a shape to fit snugly over a tire, rim, and felly of a wheel, one side piece being provided with a concave shaped depressed portion, the other side piece being provided with a depressed portion semicircular in shape on bottom with parallel perpendicular sides, the said side piece carrying pivotally attached thereto a movable handle with one end inserted in said depressed portion, a clamping piece with one end having a rolled portion and the other bifurcated end pivotally attached to said handle, capable of being raised and locked by manual movement of said handle, and means for connecting said pieces in operating position as and for the purpose described.

3. In combination a device consisting of a base piece provided with a multiple of spikes and grips, two bifurcated side pieces forming jaws carried by said base piece, said base and side pieces being of a shape on their inner surfaces to fit snugly over a tire, rim and felly of a wheel, one side piece is provided with a depressed portion semicircular on bottom with parallel sides, carrying pivotally attached thereto a handle with one end inserted in said depressed portion, said handle being provided with three holes for insertion of bolts, three bolts, one for pivotally attaching said handle to said side piece, the second for pivotally attaching a clamping piece, and the third, a headed bolt, provided with an eye, for inserting through the clamping piece when raised, capable of being permanently locked by the insertion of the hasp of a lock through said eye, and a clamping piece provided with two holes, one for pivotally attaching it to said handle and the other for insertion of said headed locking bolt, substantially as and for the purpose described.

In testimony whereof, I affix my signature in the presence of two witnesses.

DEMARKUS S. BLACKWELL.

Witnesses:
H. CUPPS,
C. T. BYRD.